US 6,696,154 B2

United States Patent
Martinotto et al.

(10) Patent No.: US 6,696,154 B2
(45) Date of Patent: Feb. 24, 2004

(54) CABLE, IN PARTICULAR FOR TRANSPORT OR DISTRIBUTION OF ELECTRICAL ENERGY AND INSULATING COMPOSITION

(75) Inventors: Luca Martinotto, Legnano (IT); Franco Peruzzotti, Legnano (IT); Marcello Del Brenna, Milan (IT)

(73) Assignee: Pirelli Cavi E Sistemi S.p.A., Milan (IT)

( * ) Notice: Subject to any disclaimer, the term of this patent is extended or adjusted under 35 U.S.C. 154(b) by 0 days.

(21) Appl. No.: 10/054,950

(22) Filed: Jan. 25, 2002

(65) Prior Publication Data

US 2002/0164480 A1 Nov. 7, 2002

Related U.S. Application Data

(63) Continuation of application No. PCT/EP00/07114, filed on Jul. 24, 2000.
(60) Provisional application No. 60/146,148, filed on Jul. 30, 1999.

(30) Foreign Application Priority Data

Jul. 27, 1999 (EP) .............................................. 99202460

(51) Int. Cl.$^7$ .............................. D02G 3/00; H01B 9/02; C08K 5/34
(52) U.S. Cl. ........................ 428/379; 428/375; 428/383; 174/110 PM; 524/100; 524/495
(58) Field of Search ................................ 428/375, 379, 428/383, 389; 174/100 PM, 110 SR, 120 SR; 524/100, 451, 495

(56) References Cited

U.S. PATENT DOCUMENTS

| 4,778,866 A | * | 10/1988 | Shimada et al. ............. 526/245 |
| 4,833,209 A | * | 5/1989 | Beijleveld et al. ........... 525/298 |
| 4,870,121 A | * | 9/1989 | Bamji et al. .................. 524/91 |
| 5,656,371 A | * | 8/1997 | Kawahigashi et al. ...... 428/375 |
| 5,719,218 A | * | 2/1998 | Sarma ........................ 524/180 |
| 5,871,706 A | * | 2/1999 | Whitehouse .............. 423/449.2 |
| 5,872,177 A | * | 2/1999 | Whitehouse ................. 524/495 |
| 5,880,186 A | * | 3/1999 | Todesco et al. ............. 524/100 |
| 2002/0082673 A1 | * | 6/2002 | Benz et al. .................. 607/116 |
| 2002/0164480 A1 | * | 11/2002 | Martinotto et al. ......... 428/375 |
| 2002/0198303 A1 | * | 12/2002 | Ihara et al. ................. 524/436 |

FOREIGN PATENT DOCUMENTS

| DE | 2709139 | 9/1978 |
| EP | 0 089 490 | 9/1983 |
| EP | 0 111 043 | 6/1984 |
| EP | 490854 A2 * | 6/1992 |
| GB | 1 304 112 | 1/1973 |

OTHER PUBLICATIONS

Fujikura Cable Works Ltd., "Polyalphaolefine Composition Having Improved Insulation Breakage", Derwents Abstract of JP 47028042, Jan. 30, 1971.
J. March, "Advanced Organic Chemistry", Aliphatic Nucleophilic Substitution, 3rd Ed. pp. 342–343 and 479–484, (Jul. 29, 1985).

* cited by examiner

*Primary Examiner*—Cynthia H. Kelly
*Assistant Examiner*—J. Gray
(74) *Attorney, Agent, or Firm*—Finnegan, Henderson, Farabow, Garrett & Dunner, L.L.P.

(57) ABSTRACT

Electrical cable having at least one conducting element, at least one polyolefin-based insulating covering layer, in which said insulating covering layer has at least one voltage stabilizer, said voltage stabilizer being a benzophenone substituted with at least one group selected from alkyl, arylalkyl and alkylaryl wherein said group: a) is linked to a phenyl ring of the benzophenone directly or via an oxygen bridge (-O-); b) contains, optionally, one or more oxygen bridges (-O-); and c) is optionally linked to a phenyl ring of at least one or other benzophenone group, provided that when said at least one group is an alkyl, optionally substituted, the carbon atom of said alkyl which is directly linked to a phenyl ring of said benzophenone is tertiary. A polyolefin-based insulating composition having at least one voltage stabilizer as described above.

8 Claims, 2 Drawing Sheets

CABLE, IN PARTICULAR FOR TRANSPORT OR DISTRIBUTION OF ELECTRICAL ENERGY AND INSULATING COMPOSITION

CROSS REFERENCE TO RELATED APPLICATIONS

This application is a continuation of international application number PCT/EP00/07114, filed Jul. 24, 2000, the content of which is incorporated herein by reference, and claims the priority of European Patent Application No. 99202460.4, filed Jul. 27, 1999, and the benefit of U.S. Provisional Application No. 60/146,148, filed Jul. 30, 1999, the content of which is incorporated herein by reference.

BACKGROUND OF THE INVENTION

Field of the Invention

The present invention concerns a cable, in particular for transport or distribution of electrical energy and insulating composition used therein.

In particular, the present invention concerns a cable, in particular for transport or distribution of electrical energy, preferably at medium or high voltage, comprising an insulating covering consisting of a polymeric composition comprising at least one polyolefin having improved electrical properties.

Within the scope of the present invention, "medium voltage" means a voltage ranging from 5 to 35 kV, while "high tension" means a voltage greater than 35 kV.

DESCRIPTION OF THE RELATED ART

At present, for the production of insulating layers of cables for transport of energy, cross-linked polyolefins are preferred. Typically, this polyolefin is a cross-linked polyethylene (XLPE).

Generally, the covering structure of such cables comprises three different layers of extruded material:

internal semiconducting layer;

insulating layer;

external semiconducting layer.

This covering structure is generally made by passing a metallic conductor through an extrusion head into which together flow three extruders (triple-head extrusion), which deposit the aforesaid layers onto the said metallic conductor in the order indicated above. In the case where it is desired to subject the said external layer to cross-linking, immediately after the extrusion the cable passes into a suitable device, also referred to as a vulcanising tube, where the said cross-linking is effected.

Generally the cross-linking is achieved by via radicals by thermal decomposition of organic peroxides, for example dicumyl peroxide, tert-butyl cumyl peroxide and the like, which are added to the polyolefin before the extrusion or injected directly into the extruder.

The extrusion temperature of the material which constitutes the insulating layer must not exceed the limit imposed by the decomposition temperature of the peroxide utilised. For example, when dicumyl peroxide is used, the temperature of the extruder is maintained below 130° C. to avoid premature cross-linking of the insulating material.

Advantageously, the cross-linking process is performed at a temperature ranging from 200 to 400° C. and the time necessary to achieve complete cross-linking of the insulating material varies from case to case depending on parameters well known to the technician of the field. Preferably, upon completion of the cross-linking, the cable is subjected to a degassing treatment, generally at a temperature of about 70–90° C., to eliminate decomposition products of the peroxide such as, for example, methanol and water since their presence within the insulating layer can prejudice its performance in time. Then, the cable is cooled and collected on reels.

Finally, the cable is completed by the addition of a metallic screen, an external sheath and, in some cases, other protective coverings (armouring).

It is well known that, in general, dielectric strength (DS) values measured on the insulating layer of a real cable are markedly lower than the values obtained when the same insulating material is in the form of flat samples (plates). The reasons for these differences are not fully known but it is believed this limitation of the DS values on the cable may be due to the presence of defects (for example: voids, protrusions, metallic particles and contaminants), formed in the insulating layer during the extrusion process. The quantity of such defects would increase on increasing thickness of the insulating layer.

The presence of such defects would also be responsible for a considerable diminution in the lifetime of the cable.

In the art, various attempts have been described intended to limit the adverse consequences of such effects by adding small quantities of additives commonly referred to as "voltage stabilizers" to the material which forms the insulating layer.

For example, EP-A-0 089 490 and EP-A-0 111 043 teach the use, as voltage stabilizer, of a mixture consisting of one or more divalent aliphatic alcohols having from 4 to 15 carbon atoms and of aliphatic or aliphatic/aromatic compounds, which are liquids or liquefy below 80° C. and which contain alcoholic and/or ketonic functional groups. The said stabilizing mixture is added to the electrical insulating material in quantities of between 0.3 and 5% by weight. The insulating material is based on a polyolefin such as, for example, a low-density polyethylene cross-linked via peroxide. The aforesaid insulating material is said to show improved dielectric resistance over time even in the presence of moisture, offering protection against growth of the so-called "water trees" and against occurrence of the so-called "electrical trees". Both acetophenone and benzophenone are mentioned among the materials constituting the aforesaid stabilizing mixture.

DE 2 709 139 describes the use of a diaryl-ketonic carboxylic acid or of an ester thereof, in quantities that range from 0.1 to 5% by weight, as electrical voltage stabilizer in a polyolefin-based insulating material. The said voltage stabilizer is said not to interfere with the cross-linking process and would not be inactivated by peroxides only because it is generated "in situ" by decomposition of the cross-linking agent itself. As an example of a voltage stabilizer, benzophenone-2-carboxylic acid, deriving from the decomposition of the cross-linking agent 3-t-butylperoxy-3-phenylphthalide, is in fact mentioned.

JP 47-28042 describes the use of benzophenone or benzophenone substituted with alkyl groups, aryl groups, halogen, or OH groups with poly alpha-olefins to improve dielectric breakdown strength in insulation of high-voltage cables or electrical machine. As an example of benzophenone derivatives 2-hydroxy-4-n-octyloxy benzophenone, 2,2'-dihydroxy-4-n-oxyloxybenzophenone, 2,2'-dihydroxy-4-n-dodecylbenzophenone, 2,2'-dihydroxy-4-n-dodecyloxybenzophenone, 2,2'-dichloro-4-methylbenzophenone, 2,2'-dihydroxy-4-n-butyloxybenzophenone, 2-bromo-4-methylbenzophenone are mentioned.

GB 1304112 describes a method for the polymerization of monomers and crosslinking of polymers with radiation. Insulation on electrical conductors can be crosslinked with the predominantly continuum visible light radiation from the radiation source by exposing the insulated conductor to the predominantly continuum visible light radiation. The rate and extent of crosslinking can be enhanced by blending the crosslinkable polymer with photosensitizers among which benzophenone, 3- or 4-methylbenzophenone or 3- or 4-methoxybenzophenone are mentioned.

Therefore, the need to produce electrical cables equipped with a polyolefin insulating covering having improved electrical properties, in particular high values of dielectric strength and stability over time, but using conventional cross-linking systems, is still keenly felt.

SUMMARY OF THE INVENTION

The Applicant proposed to satisfy this need by adding a voltage stabilizer having the following group of properties to the material that constitutes the insulating layer of the cable:
- ability to increase the lifetime and the dielectric strength of the insulating layer without substantially altering the other electrical properties required for an insulating material, in particular low dielectric loss (tandelta) values;
- high stability in the insulating material over time thanks to a reduced ability to migrate towards the external surface of the insulating layer itself. In fact, the migration of the additive involves a loss of the stabilizing effects over time, above all in the interface zone between the internal semiconducting layer and the insulating layer where probability of partial discharges is the greatest;
- substantial inertness towards commonly used cross-linking agents, in particular organic peroxides, thus avoiding phenomena of inhibition of the cross-linking reaction and/or alteration or destruction of the additive itself during the cross-linking process;
- chemical and physical properties which make the use of the additive in the cable production process convenient and safe, in particular suitable boiling point (B.Pt.), melting point (M.Pt.) and ignition temperature (flash point) values, and substantial lack of toxicity.

The Applicant has found that this objective is achieved by using, as voltage stabilizers, benzophenones substituted with functional groups as defined hereinbelow.

Thus, according to a first aspect, the present invention concerns an electrical cable comprising at least one conducting element, at least one polyolefin-based insulating covering layer, in which the said covering layer comprises at least one voltage stabilizer, characterized in that the said voltage stabilizer is a benzophenone substituted with at least one group selected from alkyl, arylalkyl, and alkylaryl, and in that the said group:
a) is linked to a phenyl ring of the benzophenone directly or via an oxygen bridge (—O—);
b) contains, optionally, one or more oxygen bridges (—O—); and
c) is optionally linked to a phenyl ring of at least one other benzophenone group,
provided that when said at least one group is an alkyl, optionally substituted, the carbon atom of the said alkyl which is directly linked to a phenyl ring of the said benzophenone is tertiary.

In a preferred embodiment the total number of carbon atoms of said at least one group is greater than 8 The presence of at least one group with more than 8 carbon atoms improves compatibility of the voltage stabilizer with the polyolefin-based insulating material, thus decreasing exudation (migration) of the additive from the insulating material.

According to a preferred aspect, the voltage stabilizer is a substituted benzophenone of formula (I):

wherein:
$R_1$, $R_2$, $R_3$ and $R_4$, equal or different from each other, are selected from:
hydrogen;
$C_6$–$C_{14}$ aryl, substituted with at least one group selected from $C_1$–$C_{30}$ alkyl, $C_1$–$C_{30}$ alkoxy and $C_6$–$C_{14}$ aryloxy;
$C_1$–$C_{30}$ alkyl, optionally substituted with at least one group selected from $C_6$–$C_{14}$ aryl, $C_1$–$C_{30}$ alkoxy and $C_5$–$C_{14}$ aryloxy;
$C_1$–$C_{30}$ alkoxy, optionally substituted with at least one group selected from $C_6$–$C_{14}$ aryl and $C_6$–$C_{14}$ aryloxy;
$C_6$–$C_{14}$ aryloxy, optionally substituted with at least one group selected from $C_6$–$C_{14}$ aryl, $C_1$–$C_{30}$ alkyl, $C_1$–$C_{30}$ alkoxy;
a group of formula:

wherein:
$R_1'$, $R_2'$, $R_3'$ and $R_4'$, equal or different from each other, are selected from the same groups indicated above for $R_1$, $R_2$, $R_3$ and $R_4$; and
—Q— is a group of formula —O—$R_5$—O—, where $R_5$ is selected from:
$C_1$–$C_{30}$ alkylene, optionally substituted with at least one group selected from $C_6$–$C_{14}$ aryl, $C_1$–$C_{30}$ alkoxy and $C_6$–$C_{14}$ aryloxy;
$C_6$–$C_{14}$ arylene, optionally substituted with at least one group selected from $C_1$–$C_{30}$ alkyl, $C_1$–$C_{30}$ alkoxy and $C_5$–$C_{14}$ aryloxy;
wherein, optionally, the alkyl and alkoxy groups have one or more oxygen bridges (—O—) along the aliphatic chain;
provided that:
at least one of the substituents $R_1$, $R_2$, $R_3$ and $R_4$ is different from hydrogen; and
when said at least one group is an alkyl, optionally substituted, the carbon atom of the said alkyl which is directly linked to a phenyl ring of the said benzophenone is tertiary.

According to the present invention, when the benzophenone of formula (I) according to the present invention is used in a cross-linking system, $R_1$, $R_2$, $R_3$, $R_4$, $R_1'$, $R_2'$, $R_3'$ and $R_4'$ have the meanings indicated above, provided that when at least one of these is a $C_1$–$C_{30}$ alkyl, optionally substituted as indicated above, the carbon atom of the said alkyl which is directly linked to a phenyl ring of the said benzophenone is tertiary.

It has in fact been found that these compounds are more stable towards the cross-linking agents, in particular towards the peroxides, than corresponding compounds having alkyl substituents which have benzylic hydrogens. In this way, a possible interaction between the voltage stabilizer and the cross-linking agent is substantially avoided.

Preferably, the said polyolefin is a polyolefin cross-linked via radicals, still more preferably cross-linked via peroxides.

Typically, the said voltage stabilizer has a boiling point higher than the extrusion temperature of the insulating material. Further, to guarantee an optimal dispersion of the stabilizer in the polymeric material, the said stabilizer preferably has a melting point lower than the extrusion temperature of the insulating material.

Typically, using polyethylene as the insulating material, the said voltage stabilizer preferably has a boiling point higher than 180° C. and a melting point lower than 150° C. In order to avoid handling problems with the said voltage stabilizer, particularly in the cable production stage, it preferably has an ignition temperature (flash point) higher than 110° C.

Preferably, the quantity of the said voltage stabilizer in the insulating layer ranges from 0.1 to 5% by weight relative to the total weight of the said insulating layer, and still more preferably it ranges from 0.5 to 2%.

In a preferred embodiment, the said insulating covering layer of the cable according to the present invention is cross-linked using a peroxide selected from the group comprising dicumyl peroxide, tert-butyl peroxide, tert-butyl cumyl peroxide, 2,5-dimethyl-2,5-di(tert-butylperoxy) hexane, α,α'-bis(tert-butylperoxy)diisopropylbenzene, and the like, or mixtures thereof.

Besides the said polyolefin, the said peroxide and the said voltage stabilizer, the insulating layer of the cable according to the present invention can also comprise other conventional additives such as, for example, antioxidants, processing aids, lubricants, pigments, "water-tree retardant" additives, and the like.

According to a second aspect, the present invention concerns a polyolefin-based insulating composition comprising at least one voltage stabilizer, characterized in that the said voltage stabilizer is a benzophenone substituted with at least one group selected from alkyl, arylalkyl, and alkylaryl, and in that the said group:

a) is linked to a phenyl ring of the benzophenone directly or via an oxygen bridge (—O—);
b) contains, optionally, one or more oxygen bridges (—O—); and
c) is optionally linked to a phenyl ring of at least one other benzophenone group, provided that when said at least one group is an alkyl, optionally substituted, the carbon atom of the said alkyl which is directly linked to a phenyl ring of the said benzophenone is tertiary, and with the proviso that said substituted benzophenone is different from 3- or 4-methoxy-benzophenone. Preferably the said voltage stabilizer is a substituted benzophenone of formula (I) as defined above. In a preferred embodiment the total number of carbon atoms of said at least one group is greater than 8.

Examples of $C_6$–$C_{14}$ aryl groups are phenyl, naphthyl, anthracyl, biphenyl and the like. Preferably, the aryl group is phenyl.

"$C_1$–$C_{30}$ alkyl" means an aliphatic group, linear or branched, of formula —$C_nH_{2n+1}$, where n is an integer from 1 to 30, or a cycloalkyl group of formula —$C_mH_{2m}$, where m is an integer from 3 to 30. Examples of $C_1$–$C_{30}$ alkyl groups are methyl, ethyl, n-propyl, isopropyl, n-butyl, isobutyl, tert-butyl, n-pentyl, 1-methyl-butyl, 1-ethyl-butyl, 1,1-dimethyl-butyl, 1-methyl-1-ethyl-butyl, 1,2-dimethyl-butyl, 1-methyl-2-ethyl-butyl, 1,3-dimethyl-butyl, cyclobutyl, cyclohexyl, 2-methyl-cyclohexyl, 3-methylcyclohexyl, 4-methylcyclohexyl, and the like, and superior homologues thereof.

Preferably, the $C_1$–$C_{30}$ alkyl group is a tertiary alkyl group such as, for example, tert-butyl, 1,1-dimethyl-butyl and 1-methyl-1-ethyl-butyl.

With "$C_1$–$C_{30}$ alkoxy" it is meant
a group of formula —O—$C_pH_{2p+1}$ where p is an integer ranging from 1 to 30, or
a chain of general formula in which $R_6$ is a $C_1$–$C_4$ alkyl and q, r, s and t are 0 or an integer ranging from 1 to 30, provided that the total number of carbon atoms ranges from 2 to 30.

Examples of alkoxy groups are —$OCH_3$, —$OC_2H_5$, —O—$(CH_2)_tCH_3$ (t integer between 2 and 24), —O—CH$(CH_3)CH_3$, —O—C$(CH_3)_3$, —$OCH_2OCH_3$, —$OCH_2OCH_2OCH_3$, —O$(CH_2O)_4CH_3$, —$OCH_2CH_2C_2H_5$, —O—$CH_2OCH_2OC_2H_5$, and the like, and superior homologues thereof.

Preferably, alkoxy is a group of formula —O—$C_pH_{2p+1}$ where p is an integer ranging from 1 to 20, even more preferably from 5 to 20.

Examples of $C_6$–$C_{14}$ aryloxy groups are phenyloxy, naphthyloxy, p-phenyl-phenyloxy and the like. Preferably, aryloxy is a phenyloxy group.

Preferably, —Q— is a group of formula —O—$(CH_2)_u$—O—, where u is an integer ranging from 1 to 24, even more preferably from 5 to 15.

Typical examples of substituted benzophenones according to the present invention are those selected from the group comprising:, 2,4-di-octyloxy-benzophenone, 4(1,1-dimethyl-1-tridecyl) benzophenone, 4,4'-di-tertbutyl-benzophenone, 4-dodecyloxy-benzophenone, 1,12-di-4-benzoylphenoxy dodecane, 4-octadecyloxy-benzophenone and 4,4'-di-dodecyloxy-benzophenone.

Preferably, the substituted benzophenone of the present invention is selected from 2,4-dioctyloxy-benzophenone, 4(1,1-dimethyl-1-tridecyl)benzophenone, 4,4'-di-tert-butylbenzophenone, 4-dodecyloxy-benzophenone, 1,12-di-4-benzoylphenoxy dodecane, 4-octadecyloxy-benzophenone and 4,4'-di-dodecyloxy-benzophenone.

BRIEF DESCRIPTION OF THE DRAWINGS

Characteristics and advantages of the invention will now be described with reference to the following figures in which.

DETAILED DESCRIPTION OF THE INVENTION

Figure 1:
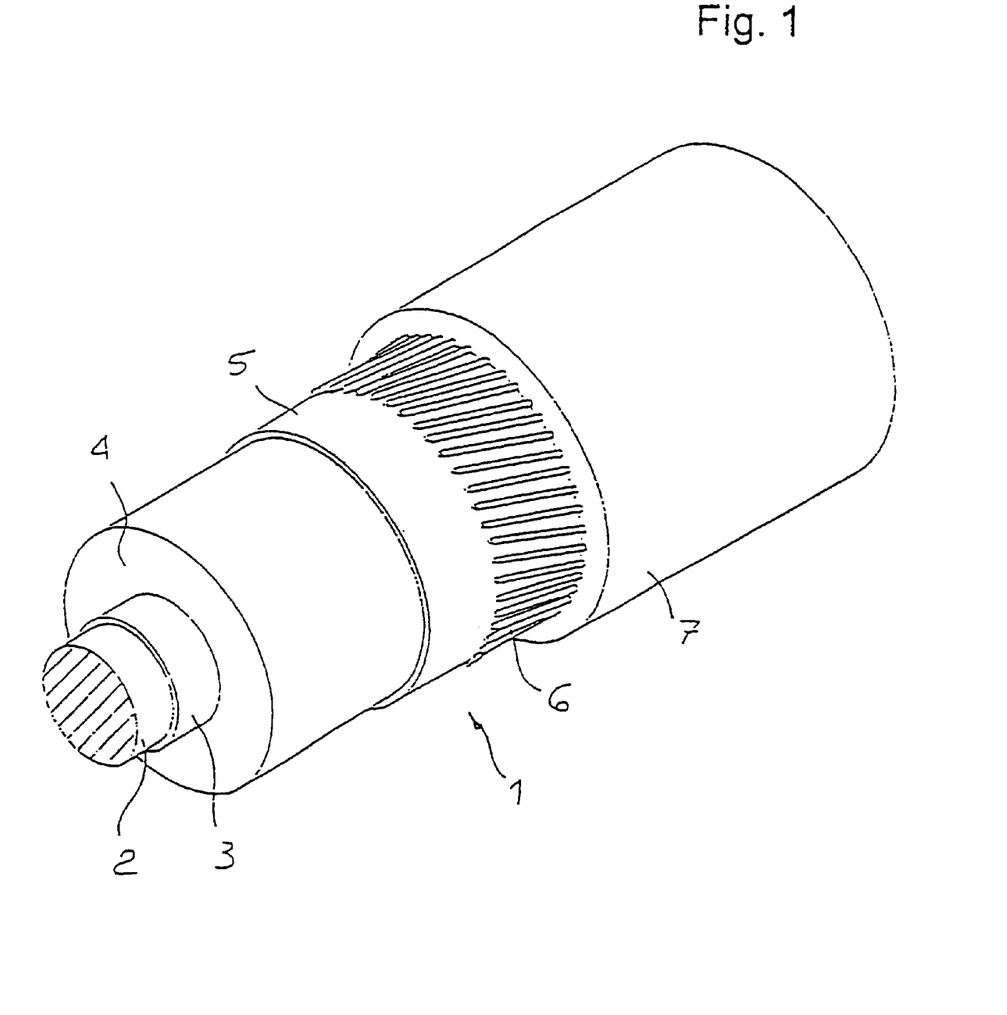
FIG. 1 shows a perspective view of an insulated electrical cable according to the invention.

In FIG. 1, 1 indicates an insulated electric cable as a whole, comprising a metallic conductor 2, an internal semiconducting layer 3, an insulating layer 4, an external semiconducting layer 5, a metallic screen 6, of wound wires or conducting bands, then covered with a sheath 7.

The internal and external semiconducting layers 3 and 5 are made of suitable conventional materials, extruded onto the conductor 2, separately or simultaneously with the insulating covering layer 4 according to the present invention. The screen 6 and the sheath 7 are also made using standard materials and techniques. At least one of the semiconducting layers 3 and 5 can optionally incorporate one or more voltage stabilizers according to the present invention.

The polyolefin constituting the base of the insulating material can be selected, for example, from: polyolefins (homopolymers or copolymers of different olefins), copolymers of olefins/ethylenically unsaturated esters, polyesters; polyethers, copolymers of polyethers/polyesters, and mixtures thereof. Examples of such polymers are: polyethylene (PE), in particular high density PE (HDPE), low density PE (LDPE), linear low density PE (LLDPE), very low density PE (VLDPE); polypropylene (PP); thermoplastic propylene/ethylene copolymers; ethylene-propylene (EPR) or ethylene-propylene-diene (EPDM) rubbers; natural rubbers; butyl rubbers; ethylene/vinylacetate copolymers (EVA); ethylene/methyl-acrylate copolymers (EMA); ethylene/ethyl-acrylate copolymers (EEA); ethylene/butyl-acrylate copolymers (EBA); thermoplastic ethylene/alpha-olefin copolymers, and the like.

The substituted benzophenones according to the present invention can be found on the market or they may be prepared with synthetic methods well known to anyone of ordinary skill in the field.

For example, when an aromatic ring of the benzophenone of formula (I) is substituted by an alkyl and/or an aryl as described above, this can be produced by reacting benzoyl chloride with a phenyl group suitably substituted by aryl and/or alkyl, in the presence of a Lewis acid in a polar organic solvent in accordance with the Friedel Crafts reaction (J. March, "Advanced Organic Chemistry", 3rd Ed., 1985, pp. 479–484).

In the case where an aromatic ring of the benzophenone of formula (I) is substituted by an alkoxyl as described above, this can be produced by reacting a hydroxybenzophenone with a suitable alkyl halide in the presence of a base in accordance with the Williamson reaction (J. March, "Advanced Organic Chemistry", 3rd Ed., 1985, pp. 342–343).

Some examples of the preparation of the said substituted benzophenones are illustrated in more detail in the experimental part of the present invention.

Figure 2:
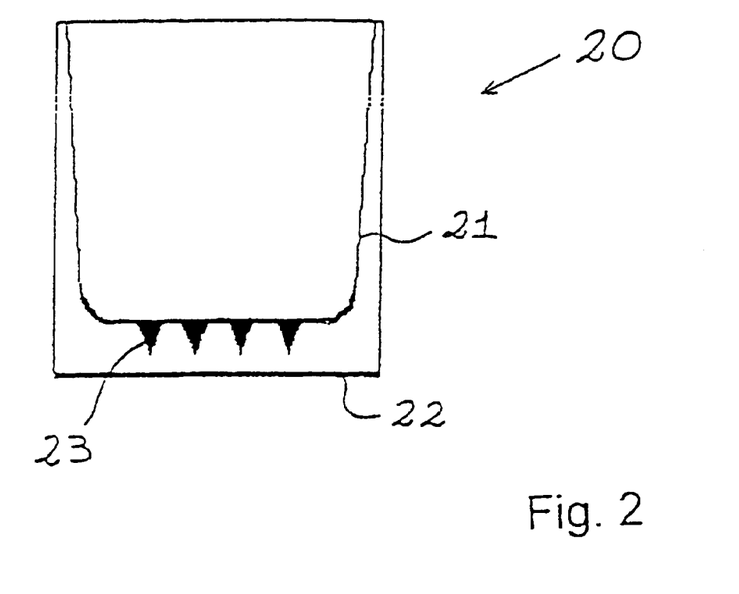
FIG. 2 is a vertical sectional view of a test piece utilised for evaluation of the dielectric strength of the material constituting the insulating layer of the cable of the present invention.
Figure 3:
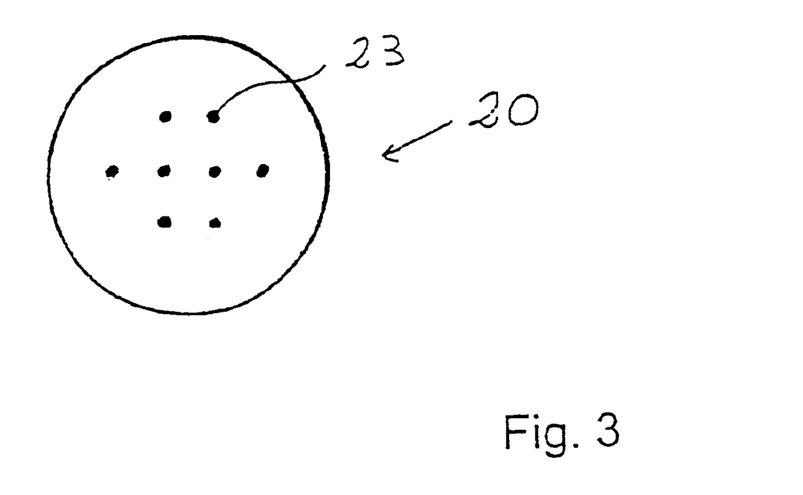
FIG. 3 is a top view of the internal bottom of the test piece of FIG. 2.

The structure and the function of the test piece illustrated in FIGS. 2 and 3 are described in detail in the next chapter devoted to the "Tests of Dielectric Strength".

The present invention is now further described by the following Examples and Tests which are solely for illustrative purposes and must not be considered to limit the invention in any way.

EXAMPLE 1

Preparation of 4,4'-di-tert-butyl Benzophenone (ADD4)

Carbon tetrachloride (160 ml, 1.65 moles) and aluminium trichloride (49.3 g; 0.37 moles) were loaded into a 1 liter flask, equipped with hydrochloric acid trap and mechanical stirrer. The temperature of the mixture obtained was brought to 5° C. using an ice-bath and tert-butyl-benzene (115.6 ml, 0.74 moles) was added dropwise over 2 hours, maintaining the temperature below 10° C. After the addition of about ⅓ of the tert-butylbenzene, a sudden increase in the temperature was observed, thus indicating the initiation of the reaction. Once the addition of the tert-butylbenzene had been completed, the mixture was left at ambient temperature for 18–20 hours. When a compact solid formed, rendering the stirring of the mixture difficult, water (150 ml) was added with continuous stirring, and a rise in the temperature to 70–80° C. was observed. After 3 hours, the phases were separated; the organic phase was washed with water (3×80 ml) and the aqueous phases obtained from this washing were combined and washed with methylene chloride (2×50 ml). The organic phases were combined, dried and the solvent removed. The solid obtained was crystallized from absolute ethanol (150 ml) and the dark-coloured precipitate was again crystallized from absolute ethanol with the addition of activated carbon. The product was sublimed (120° C., 0.5–1 mm Hg) in order to obtain the desired product (sublimate) in the form of a white solid (M.Pt.=134–135° C.).

MS (m/e, rel. int.): 294 (24), 279 (12), 161 (100). $^1$H NMR (CDCl$_3$,δ): 1.35 (s, 18H); 7.1 (d, 4H), 7.7 (d, 4H).

EXAMPLE 2

Preparation of 4-dodecyloxy Benzophenone (ADD5)

4-hydroxybenzophenone (10.6 g; 0.05 moles) was suspended in dodecyl bromide (37 g; 0.15 moles) under nitrogen under reflux. When the solution became homogeneous, sodium carbonate (49.3 g; 0.10 moles) was added and the mixture was left under reflux for 12 hours. After cooling, the unreacted dodecyl bromide was removed under vacuum. Methylene chloride (10 ml) was added to the product, and after filtration the solvent was removed in order to obtain a chestnut-coloured dry product which was crystallized from hexane.

In this way, the desired product was obtained in the form of white flakes (yield 82%; M.Pt.=63–64° C.).

MS (m/e, rel. int.): 366 (4), 211 (100), 121 (40), 105 (40), 77 (13) $^1$H NMR (CDCl$_3$, δ): 1.2 (t, 3H), 1.3–1.5 (m, 20H), 4.14 (t, 2H), 6.93 (d, 2H), 7.50 (m, 3H), 7.80 (m, 4H).

| $C_{25}H_{34}O_2$ | Elemental Analysis | | |
|---|---|---|---|
| | C | H | O |
| % found | 81.8 | 9.3 | 8.6 |
| % calculated | 81.92 | 9.35 | 8.73 |

EXAMPLE 3

Preparation of 1.1 2-di-4-Benzoylphenoxydodecane (ADD8)

The same procedure was used as in the previous Example 3, except that 4-hydroxy-benzophenone (2 moles) was suspended in 1,12-dibromododecane (5 moles) instead of in dodecyl bromide, at 160° C. for 12 hours. The crude product was diluted in methylene chloride (100 ml), filtered and washed thoroughly with methylene chloride. The combined organic phases were washed with water and taken to dryness to remove the solvent. The dry product was crystallized from ethanol (1:15).

In this way, the desired product was obtained (M.Pt.= 137–138° C.).

MS (m/e, rel. int.): 562 (1.7), 211 (12), 121 (40), 105 (100), 77 (30) $^1$H NMR (CDCl$_3$, "): 1.14 (m, 16H), 1.81 (q, 4H), 4.14 (t, 4H), 6.94 (d, 4H), 7.52 (m, 6H), 7.79 (m, 8H).

EXAMPLE 4

Preparation of 2,4-di-octiloxy Benzophenone (ADD11)

2,4-dihydroxybenzophenone (5 g, 23 mmol) and polyethylenglycol (PEG 6000) (1 g) in toluene (25 ml) and NaOH 30% (6,26 g, 47 mmol) were loaded into a 100 ml three-necked flask. The solution was kept under reflux with Dien-Stark to remove water. The solution was cooled at 40° C. Dimethylsulfoxide (DMSO) (7 ml) and octylbromide (8 ml, 47 mmol) were added and the solution thus obtained was kept under reflux with Dien-Stark for 8 hours. NaOH 30% (30 ml) and methylisobutylketone (MIBK) (10 ml) were added. The aqueous phase containing the unreacted dihydroxybenzophenone sodium salt was separated from the solution. The organic phase was washed with water. The aqueous phase was reextracted with MIBK (10 ml). Both aqueous and organic phases were cloudy (the organic phase was filtered on silica). After removal of the solvent from the organic phase the crude product was dissolved in cool ethyl-acetate (9 ml) and methanol (65 ml) was added. The product crystallized at —5° C. The product was recrystallized from methanol at 30° C. cooling up to 10° C. (yield 35%; m.pt. 37,7–38,1° C.).

EXAMPLE 5

Preparation of 4 (1 1-dimethyl-1-tridecyl) benzophenone(ADD 12)

Benzoyl chloride (14,64 g, 0,1041 mol) dissolved in methylene chloride (60 ml) was loaded in a 250 ml three-necked flask, and aluminun trichloride (5,09 g, 0,038 mol) was added to the solution mantaining the temperature at 5° C. The solution thus obtained was clear and light yellow. 1,1-dimethyl-1-tridecyl benzene (10 g, 0,0347 mol) was slowly added to the light yellow solution, the latter changing colour and becoming brown after thirty minutes. The reaction was left at a temperature of 5° C. for five hours and thirty minutes. NaOH 4M (80 ml) was added dropwise to the reaction mixture, mantaining the temperature lower than 5° C. The two phases were shaked over night. The crude product was distilled with a Buchi apparatus (b.pt.=160° C. at a P=1 mbar, yield 53%).

Tests

A. Materials Used.

The materials used were:

LDPE: low density polyethylene ($\delta$=0.922 g/cm$^3$; MFI=2 g/10 min; Riblene™ FL30 from Polimeri Europa).

XLPE: LDPE+dicumyl peroxide (Dicum™ from Hercules, 2% by weight)+antioxidant (Santonox™ R from Monsanto, 0.2% by weight).

Additives Examined:

| Additive | | Code | M. Wt. | M. Pt. | B. Pt. | Flash Point |
|---|---|---|---|---|---|---|
| acetophenone |  | ADD1 | 120.15 | 20 | 85 | 76 |
| benzophenone |  | ADD2 | 182.22 | 49 | 305 | 138 |
| 3, 4 dimethyl benzophenone |  | ADD3 | 210.28 | 45 | | >110 |

-continued

Additives Examined:

| Additive | Code | M. Wt. | M. Pt. | B. Pt. | Flash Point |
|---|---|---|---|---|---|
| 4,4'-di-tert-butyl benzophenone | ADD4* | 294.43 | 134 | — | — |
| 4-dodecyloxy benzophenone | ADD5* | 366.53 | 63.4 | — | >110 |
| 2-hydroxy-4-octadecyloxy benzophenone | ADD6 | 326 | 48 | — | >110 |
| dodecaphenone | ADD7 | 260 | 45 | 214[16] | 110 |
| 1,12-di-4-benzoylphenoxy dodecane | ADD8* | 562.7 | 135 | — | >110 |
| 4-octadecyloxy benzophenone | ADD9* | 450.70 | 78 | — | >110 |
| 4,4'-di-dodecyloxy benzophenone | ADD10* | 550.86 | — | — | >110 |

-continued

Additives Examined:

| Additive | Code | M. Wt. | M. Pt. | B. Pt. | Flash Point |
|---|---|---|---|---|---|
| 2,4-di-octiloxy benzophenone | ADD11* | 438.86 | 38 | | >110 |
| 4(1,1-dimethyl-1-tridecyl)benzophenone | ADD12* | | 160 | | >110 |

(1mbar)

*Additives of the present invention

B. Preparation of the Insulating Mixture

The low-density polyethylene (LDPE) is weighed and heated in a hot-air oven for 2 hours at 70° C.

The antioxidant and the peroxide are mixed and placed in the oven at 70° C. until a clear solution is obtained. This mixture is then added to the preheated LDPE.

This mixture is maintained at 70° C. in a hot-air oven for 1 hour, for partial absorption of the additive in the XLPE granules.

The material is then processed in a double-screw Brabender Plasticoder PL2000 laboratory apparatus equipped with metering device by means of which the additive is introduced.

From the said apparatus, the mixture is obtained in the form of filaments or granules.

C. Dielectric Strength Tests

With reference to FIG. 2, the test pieces (20) used for the DS tests are pressed "beakers" of insulating material (FIG. 2).

The said test pieces (20) are prepared from the mixture in the form of filaments deriving from the double-screw apparatus. The said material is compacted under pressure at 130° C. so as to obtain a plate of 10 mm thickness. From this are cut disks, from which the test pieces (20) are moulded (125–130° C.; 100 bar) subjected to cross-linking for 40 minutes at 180° C. and then cooled over about 35 minutes. They are then again heated to 130° C. for 30 minutes and, finally, at 70° C. for 64 hours in the oven to degas the cross-linking by-products. The bottom of the test pieces is then lacquered, both inside (21) and outside (22), with graphite-based semiconducting lacquer, which, thanks also to the properly designed internal profile, makes it possible to apply high electrical gradients. During the pressing, eight pointed cavities (23) are cut on the bottom of these test samples, with a radius of curvature of 5 microns, which simulate the strongly divergent electric field conditions that may be encountered in the vicinity of some types of defect present in real cables.

The arrangement of the individual pointed cavities (23) on the bottom of the test pieces (20) is illustrated in FIG. 3.

The DS measurements were made by applying to these test pieces, through flat electrodes placed in contact with the inside and outside face of the bottom of the test piece, a 50 Hz alternating current, increasing (voltage gradient=2 kV/sec) until the test pieces were perforated.

After the test, the pointed cavity at which the discharge occurred is identified, and the thickness between the tip of the point and the outside base of the beaker-shaped test piece is measured. For each test cycle, 9 test pieces are used. The voltage values that caused perforation in each sample (divided by the thickness of the insulating material of the test piece and hence expressed in kV/mm) were processed statistically. The value reproduced in Table 1 corresponds to the Weibull alpha value of the experimental data distribution.

For each material evaluated, at least three cycles of DS tests were performed, for a total of 27 test pieces. The DS values of the material tested were expressed as MVS (molal voltage stabilization), or as the difference between the DS of a material containing the additive and the DS of the same material without additive divided by the number of moles of additive added per kg of polymer.

The results obtained are shown in Table 1.

TABLE 1

| Mixture | Additive % (w/w) | Mean DS (kV/mm) | MVS (kV.kg.mole$^{-1}$) |
|---|---|---|---|
| XLPE | — | 12 | — |
| XLPE + ADD2 | 3 | 18 | 35.4 |
| XLPE + ADD4* | 1 | 22 | 294.4 |
| XLPE + ADD5* | 1 | 20.4 | 307.9 |
| XLPE + ADD6 | 5 | 13.3 | 8.5 |
| XLPE + ADD8* | 2 | 31.5 | 548.6 |
| XLPE + ADD9* | 2 | 33.5 | 484.5 |
| XLPE + ADD10* | 1 | 17.0 | 275.4 |
| XLPE + ADD11* | 1 | 25.1 | 574.9 |

*Additives of the present invention

Table 1 shows that the additives of the present invention lead to a considerable increase in the dielectric strength (both measured as the absolute value (DS) and as the MVS) of the insulating material compared to the comparison additives (ADD2, and ADD6).

D. Long Term Electrical Tests

The long term electrical tests were carried out with test pieces exactly the same as those illustrated in FIG. 2, except that they had a flat bottom both internally and externally. This type of test piece was chosen because, being flat, it makes it possible to exert better control over the gradient applied, whose consistency from sample to sample is fundamental for correct ageing. During the test, an alternating current is applied to a series of 10 test pieces immersed in silicone oil, and is increased of 2.5 KV/houruntil the test pieces were perforated.

The values of the discharge times and voltage gradients for the different test pieces are then processed statistically. The value reproduced in Table 2 corresponds to the Weibull alpha value of the distribution of the experimental data.

The test pieces are prepared in a manner analogous to that illustrated for the test pieces of FIG. 2, but with flat bottoms and a bottom thickness of about 0.5 mm. Thus, knowing the value of the electrical voltage applied, it is possible to link a discharge time with each ageing electrical gradient (kV/mm).

The tests are performed at ambient temperature, so that purely electrical ageing is simulated.

The results are shown in the following Tables 2.

TABLE 2

| Mixture | Additive % (w/w) | Mean DS kV/mm |
|---|---|---|
| XLPE | — | 60 |
| XLPE + ADD5* | 2 | 94 |
| XLPE + ADD11* | 1 | 89 |
| XLPE + ADD11* | 3 | 107 |
| XLPE + ADD11* | 2 | 98 |

E. Cross-Linking Process

The effect of the different additives during the cross-linking process is ascertained by ODR measuring with the Monsanto rheometer, of the Rheometer ODR$_{2000}$E type, in accordance with the standard ASTM D 2084-93. The tests were performed on XLPE to which various concentrations of additives had been added. These measurements made it possible to evaluate the level of cross-linking of each mixture by recording the torque vs. time curve at 180° C. (oscillation angle=3°) by determination of the $M_H$ (maximum torque) value.

The results are shown in Table 3 below.

TABLE 3

| Mixture | Additive % (w/w) | $M_H$ |
|---|---|---|
| XLPE | — | 25 |
| XLPE + ADD2 | 3 | 26 |
| XLPE + ADD3 | 3 | 11 |
| XLPE + ADD4* | 3 | 25 |
| XLPE + ADD5* | 1 | 23 |
| XLPE + ADD6 | 3 | 10 |
| XLPE + ADD7 | 3 | 12 |
| XLPE + ADD11* | 2 | 23 |
| XLPE + ADD12* | 2 | 21 |

Table 3 shows that the comparison additives (ADD3, ADD6 and ADD7) interfere considerably with the cross-linking process, while the additives of the present invention maintain values essentially unchanged compared to the material devoid of additive.

F. Exudation (Migration) of the Additive:

For each additive, the characteristic absorption peaks in the infrared range were identified and the calibration curve was determined (IR absorption vs. additive concentration).

For each mixture under examination, films (thickness 100 microns) were formed by compression of 4 g of mixture in an electrical press under the following conditions:

preheating: 5 minutes at 130° C.;

pressure: 200 bar;

temperature increase to 180° C.;

extraction from plate: after cooling for 10 minutes.

The cross-linked films were divided into two groups, the first one was subjected to ageing at ambient temperature (Table 4);

the second one was subjected to ageing in an oven at 90° C. to simulate the behaviour of the cable in operation (Table 5).

TABLE 4

Exudation (migration) of the additive in cross-linked samples expressed as residual concentration (% w/w) compared to the initial quantity (2% w/w);

T = roam temperature (20° C.)

| Time (days) | ADD2 | ADD3 | ADD4* | ADD5* | ADD8* | ADD9* | ADD10* | ADD11* | ADD12* |
|---|---|---|---|---|---|---|---|---|---|
| 0 | 2.00 | 2.00 | 2.00 | 2.00 | 2.00 | 2.00 | 2.00 | 2.00 | 2.00 |
| 1 | 0.77 | 0.92 | 1.70 | 1.98 | 1.99 | 1.64 | 1.95 | 1.98 | 2.00 |
| 6 | 0.45 | 0.83 | 1.50 | 1.72 | 1.99 | 1.39 | 1.91 | 1.98 | 2.00 |
| 18 | 0.29 | 0.45 | 0.85 | 1.33 | 1.98 | 1.34 | 1.90 | 1.97 | 1.97 |
| 40 | 0.29 | 0.31 | 0.75 | 1.12 | 1.99 | 1.28 | 1.88 | 1.95 | 1.97 |

TABLE 5

Exudation (migration) of the additive in cross-linked samples expressed as residual concentration (% w/w) compared to the initial quantity (2% w/w); T = 90° C.

| Time (days) | ADD2 | ADD3 | ADD4 * | ADD5 * | ADD8 * | ADD9 * | ADD10 * | ADD11 * | ADD12 * |
|---|---|---|---|---|---|---|---|---|---|
| 0 | 2.00 | 2.00 | 2.00 | 2.00 | 2.00 | 2.00 | 2.00 | 2.00 | 2.00 |
| 1 | 0.39 | 0.33 | 0.47 | 2.00 | 1.57 | 1.98 | 2.00 | 1.94 | 1.88 |
| 6 | 0.24 | 0.19 | 0.24 | 1.95 | 1.57 | 1.74 | 1.97 | 1.94 | 1.74 |
| 18 | 0.24 | 0.05 | 0.02 | 1.91 | 1.54 | 1.72 | 2.00 | 1.81 | 1.65 |
| 40 | 0.00 | 0.00 | 0.00 | 1.49 | 1.52 | 1.72 | 2.00 | 1.62 | 1.42 |

Table 4 and 5 show that additives ADD5, ADD8, ADD9, ADD10, ADD11 and ADD12 migrate much less than the other tested additives.

What is claimed is:

1. An electrical cable comprising at least one conducting element, at least one polyolefin-based insulating covering layer comprising at least one voltage stabilizer, wherein said voltage stabilizer is a substituted benzophenone of formula (I):

(I)

wherein:
$R_1$, $R_2$, $R_3$ and $R_4$, are equal or different from each other, and are selected from
hydrogen;
$C_6$–$C_{14}$ aryl substituted with at least one group selected from C1–C30 alkyl, $C_1$–$C_{30}$ alkoxy and $C_6$–$C_{14}$ aryloxy;
$C_1$–$C_{30}$ alkyl, optionally substituted with at least one group selected from $C_6$–$C_{14}$ aryl, $C_1$–$C_{30}$ alkoxy and $C_6$–$C_{14}$ aryloxy;
$C_1$–$C_{30}$ alkoxy, optionally substituted with at least one group selected from $C_6$–$C_{14}$ aryl and $C_6$–$C_{14}$ aryloxy;
$C_6$–$C_{14}$ aryloxy, optionally substituted with at least one group selected from $C_6$–$C_{14}$ aryl, $C_1$–$C_{30}$ alkyl, and 01–C30 alkoxy;
a group of formula (II):

(II)

wherein:
$R_1'$, $R_2'$, $R_3'$ and $R_4'$, are equal or different from each other, and are selected from the same groups indicated above for $R_1$, $R_2$, $R_3$ and $R_4$; and
—Q— is a group of formula —O—$R_5$—O—, where $R_5$ is selected from: $C_1$–$C_{30}$ alkylene, optionally substituted with at least one group selected from $C_6$–$C_{14}$ aryl, $C_1$–$C_{30}$ alkoxy and $C_6$–$C_{14}$ aryloxy;
$C_6$–$C_{14}$ arylene, optionally substituted with at least one group selected from $C_1$–$C_{30}$ alkyl, $C_1$–$C_{30}$ alkoxy and $C_6$–$C_{14}$ aryloxy;

wherein, optionally, the alkyl and alkoxy groups have one or more oxygen bridges (—O—) along the aliphatic chain;

provided that at least one of the substituents $R_1$, $R_2$, $R_3$ and $R_4$ is different from hydrogen; and when said at least one group is an alkyl, optionally substituted, the carbon atom of the said alkyl which is directly linked to a phenyl ring of said benzophenone is tertiary.

2. A cable according to claim 1, wherein said polyolefin is a polyolefin cross-linked via radicals.

3. A cable according to claim 2, wherein said polyolefin is cross-linked via peroxides.

4. A polyolefin-based insulating composition comprising at least one voltage stabilizer, wherein said voltage stabilizer is a substituted benzophenone of the formula (I):

(I)

wherein:
$R_1$, $R_2$, $R_3$ and $R_4$, are equal or different from each other, and are selected from
hydrogen;
$C_6$–$C_{14}$ aryl substituted with at least one group selected from $C_1$–$C_{30}$ alkyl, $C_1$–$C_{30}$ alkoxy and $C_6$–$C_{14}$ aryloxy;
$C_1$–$C_{30}$ alkyl, optionally substituted with at least one group selected from $C_6$–$C_{14}$ aryl, $C_1$–$C_{30}$ alkoxy and $C_6$–$C_{14}$ aryloxy;
$C_1$–$C_{30}$ alkoxy, optionally substituted with at least one group selected from $C_6$–$C_{14}$ aryl and $C_6$–$C_{14}$ aryloxy;
$C_6$–$C_{14}$ aryloxy, optionally substituted with at least one group selected from $C_6$–$C_{14}$ aryl, $C_1$–$C_{30}$ alkyl, and $C_1$–$C_{30}$ alkoxy;

a group of formula (II):

wherein:
R$_1'$, R$_2'$, R$_3'$ and R$_4'$, are equal or different from each other, and are selected from the same groups indicated above for R$_1$, R$_2$, R$_3$ and R$_4$; and
—Q— is a group of formula —O—R$_5$—O—, where R$_5$, is selected from: C$_1$–C$_{30}$ alkylene, optionally substituted with at least one group selected from C$_6$–C$_{14}$ aryl, C$_1$–C$_{30}$ alkoxy and C$_6$–C$_{14}$ aryloxy; C$_6$–C$_{14}$ arylene, optionally substituted with at least one group selected from C$_1$–C$_{30}$ alkyl, C$_1$–C$_{30}$ alkoxy and C$_6$–C$_{14}$ aryloxy;
wherein, optionally, the alkyl and alkoxy groups have one or more oxygen bridges (—O—) along the aliphatic chain;
provided that at least one of the substituents R$_1$, R$_2$, R$_3$ and R$_4$ is different from hydrogen;
and when said at least one group is an alkyl, optionally substituted, the carbon atom of said alkyl which is directly linked to a phenyl ring of said benzophenone is tertiary.

5. A composition according to claims 4, wherein said C$_1$–C$_{30}$ alkyl is an aliphatic group, linear or branched, of formula -C$_n$H$_{2m}$, where n is an integer from 1 to 30, or a cycloalkyl group of formula C$_m$H$_{2m}$, where m is an integer from 3 to 30.

6. A composition according to claim 4, wherein said C$_1$–C$_{30}$ alkoxy is a group of formula —O—C$_p$H$_{2p+1}$ where p is an integer ranging from 1 to 30, or a chain of general formula —O—(CH$_2$O)$_q$(CH$_2$CH$_2$O)$_r$(CH(CH$_3$)CH$_2$O)$_s$(CH$_2$CH(CH$_3$)O)$_t$—R$_6$, in which R$_6$ is a C$_1$–C$_4$ alkyl and q, r, s and t are 0 or an integer ranging from 1 to 30, provided that the total number of carbon atoms ranges from 2 to 30.

7. A composition according to claim 4, wherein —Q— is a group of formula —O—(CH$_2$)u—O—, where u is an integer ranging from 1 to 24.

8. A composition according to claim 4, wherein said substituted benzophenones are those selected from the group consisting of 2,4-dioctyloxy-benzophenone, 4(1,1-dimethyl-1-tridecyl) benzophenone, 4,4'-ditert-butyl-benzophenone, 4-dodecyloxy-benzophenone, 1,12-di-4-benzoylphenoxydodecane, 4-octadecyloxy-benzophenone and 4,4'-di-dodecyloxy-benzophenone.

* * * * *

UNITED STATES PATENT AND TRADEMARK OFFICE
CERTIFICATE OF CORRECTION

PATENT NO. : 6,696,154 B2
DATED : February 24, 2004
INVENTOR(S) : Luca Martinotto et al.

It is certified that error appears in the above-identified patent and that said Letters Patent is hereby corrected as shown below:

Column 17,
Line 40, "C1-C30" should read -- $C_1$-$C_{30}$ --.
Line 49, "01-C30" should read -- $C_1$-$C_{30}$ --.

Column 20,
Line 7, "-$C_n$ $H_{2m}$" should read -- $C_n$-$H_{2n+1}$ --.

Signed and Sealed this

Twelfth Day of October, 2004

JON W. DUDAS
*Director of the United States Patent and Trademark Office*